(12) United States Patent
Yoon

(10) Patent No.: US 8,892,320 B2
(45) Date of Patent: Nov. 18, 2014

(54) DCT CONTROL METHOD FOR VEHICLE

(71) Applicant: Hyundai Motor Company, Seoul (KR)

(72) Inventor: Young Min Yoon, Whasung-Si (KR)

(73) Assignee: Hyundai Motor Company, Seoul (KR)

(*) Notice: Subject to any disclaimer, the term of this patent is extended or adjusted under 35 U.S.C. 154(b) by 49 days.

(21) Appl. No.: 13/690,611

(22) Filed: Nov. 30, 2012

(65) Prior Publication Data

US 2014/0114541 A1  Apr. 24, 2014

(30) Foreign Application Priority Data

Oct. 18, 2012 (KR) ........................ 10-2012-0116193

(51) Int. Cl.
```
F16H 59/50      (2006.01)
B60W 10/02      (2006.01)
F16H 59/04      (2006.01)
F16H 59/38      (2006.01)
```
(52) U.S. Cl.
CPC ..................................... *F16H 59/50* (2013.01)
USPC .............. 701/55; 701/64; 477/101; 477/109; 477/110; 477/111; 74/330; 74/339; 74/340

(58) Field of Classification Search
USPC ........ 701/54, 55, 64; 477/101, 107, 109, 110, 477/111; 74/330, 339, 340
See application file for complete search history.

(56) References Cited

U.S. PATENT DOCUMENTS

| | | | |
|---|---|---|---|
| 2009/0145253 A1* | 6/2009 | Katakura et al. | 74/335 |
| 2010/0279818 A1* | 11/2010 | Soliman et al. | 477/5 |
| 2011/0054745 A1* | 3/2011 | Sato et al. | 701/54 |

* cited by examiner

*Primary Examiner* — Fadey Jabr
*Assistant Examiner* — Yazan A Soofi
(74) *Attorney, Agent, or Firm* — Morgan, Lewis & Bockius LLP

(57) ABSTRACT

The noise caused by the coupling and decoupling of the gear generated when ignition on and off of a dual-clutch mounted vehicle in the P range are switched to each other, and the merchantability of the vehicle can be increased by improving the noise performance of the vehicle by preventing the noise generated by the coupling of the gear as possible from being remarkable in other shift ranges.

4 Claims, 4 Drawing Sheets

| Ignition Switch | Lever Position | Odd stage | Even stage |
|---|---|---|---|
| IG OFF | P | N stage | N stage |
| | R | N stage | N stage |
| | N | N stage | N stage |
| | D | N stage | N stage |
| IG ON | P | First stage | R stage |
| | R | First stage | R stage |
| | N | First stage | N stage |
| | D | First stage | N stage |

| Ignition Switch | Lever Position | Odd stage | Even stage |
|---|---|---|---|
| IG OFF | P | N stage | N stage |
| | R | N stage | N stage |
| | N | N stage | N stage |
| | D | N stage | N stage |
| IG ON | P | First stage | R stage |
| | R | First stage | R stage |
| | N | First stage | N stage |
| | D | First stage | N stage |

*FIG. 1*

| Ignition Switch | Engine Cranking | Lever Position | Odd stage | Even stage | Remarks |
|---|---|---|---|---|---|
| IG OFF | | P | First stage | R stage | HOLD CURENT GEAR WHEN P STAGE IG IS OFF |
| | | R | N stage | N stage | |
| | | N | N stage | N stage | |
| | | D | N stage | N stage | |
| IG ON | Non Cranking | P | First stage | R stage | WAIT WIHTOUT COUPLING UNTIL ENGINE CRANKING HOWEVER, VERIFY REFERENCE POINT IN CASE OF P STAGE |
| | | R | N stage | N stage | |
| | | N | N stage | N stage | |
| | | D | N stage | N stage | |
| | Cranking | P | First stage | R stage | DECOUPLING/COUPLING GEAR IS NOT REQUIRED WHEN P STAGE IG IS OFF/ON |
| | | R | First stage | R stage | |
| | | N | First stage | N stage | |
| | | D | First stage | N stage | |

*FIG. 4*

DCT CONTROL METHOD FOR VEHICLE

CROSS-REFERENCE TO RELATED APPLICATION

The present application claims priority of Korean Patent Application Number 10-2012-0116193 filed Oct. 18, 2012, the entire contents of which application is incorporated herein for all purposes by this reference.

BACKGROUND OF INVENTION

1. Field of Invention

The present invention relates to a Dual Clutch Transmission (DCT) control method for a vehicle, and more particularly, to a technology regarding a DCT control strategy when ignition of a DCT mounted vehicle is on and off.

2. Description of Related Art

FIG. 1 is a diagram illustrating a Dual Clutch Transmission (DCT) control method when ignition of a DCT mounted vehicle is on and off in the related art. When an ignition-on state is switched to an ignition-off state, although a shift lever is positioned at any one of all ranges of P, R, N, and D, both an odd stage and an even stage of a DCT cancel a gear to a neutral N-stage state.

Meanwhile, when the ignition-off state of the vehicle is switched to the ignition-on state, the odd stage couples the gear at a first stage in all ranges and the even stage couples an R stage in a P range or an R range, and as a result, the vehicle may be immediately driven without an additional shifting operation when the vehicle is driven.

However, when ignition of the vehicle is on and off, an actuator is operated while a gear coupling state of the DCT is changed and thus operation noise is generated while components are operated, causing merchantability of the vehicle to deteriorate.

In particular, with switching of the ignition on and off states in the P range, THE first stage is coupled and decoupled in the odd stage and the R stage is coupled and decoupled in the even stage, and in this case, passengers may sense noise more sensitively.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art. Various aspects of the present invention provide for a Dual Clutch Transmission (DCT) control method for a vehicle that can prevent noise by coupling and decoupling of a gear which occurs when ignition on and off of a DCT mounted vehicle are switched to each other in a P range, and furthermore, increase merchantability of the vehicle by improving noise performance of the vehicle by preventing noise generated by coupling the gear from being remarkable as possible in other shift ranges.

Various aspects of the present invention provide for a DCT control method for a vehicle, including: an off-time range verifying step of verifying a range where a shift lever is positioned during ignition-off; and a shift stage holding step of holding, when an odd stage and an even stage of a DCT are in a first stage and an R stage, respectively in the case where the shift lever is positioned in a P range as a result of performing the off-time range verifying step, this state.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a diagram illustrating a Dual Clutch Transmission (DCT) control method for a vehicle in the related art.

FIG. 4 is a diagram illustrating an exemplary DCT control method for a vehicle according to the present invention.

Figure 2:
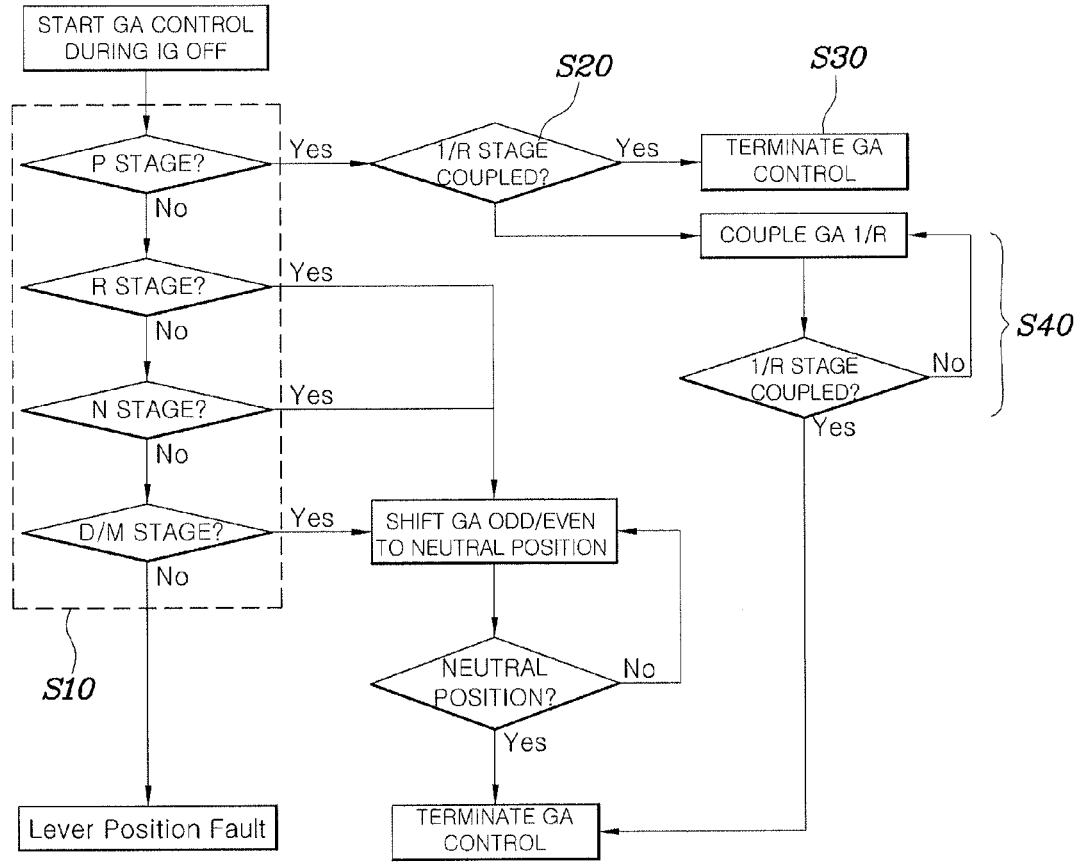
FIG. 2 is a flowchart illustrating an example during ignition-off, which illustrates an exemplary DCT control method for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
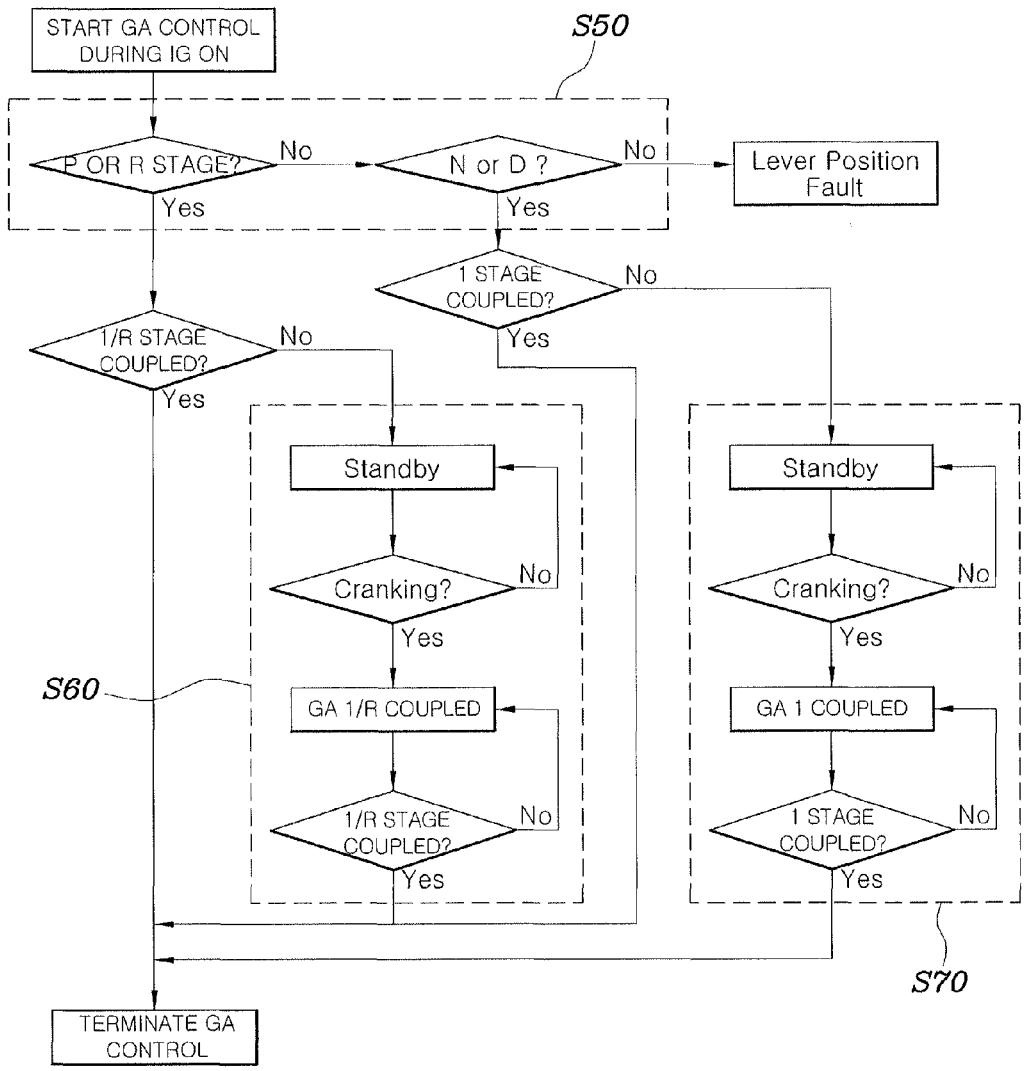
FIG. 3 is a flowchart illustrating an example during ignition-on, which illustrates an exemplary DCT control method for a vehicle according to the present invention.

Referring to FIGS. 2 and 3, various embodiments of a Dual Clutch Transmission (DCT) control method for a vehicle according to the present invention may include an off-time range verifying step (S10) of verifying a range where a shift lever is positioned during ignition-off; and a shift stage holding step (S30) of holding, when an odd stage and an even stage of a DCT are in a first stage and an R stage, respectively in the case where the shift lever is positioned in a P range as a result of performing the off-time range verifying step (S10), this state.

That is, in the case where the shift lever is positioned in the P range during ignition-off, the first stage and the R stage are not cancelled but held as they are. Therefore, the gear needs not be coupled to the first stage and the R stage in the related art even during ignition-on, and as a result, noise caused by canceling and coupling the gear in the P range is remarkably reduced.

In various embodiments, it may be preferable that a subsequent control is achieved accurately and smoothly by performing an operation of verifying a reference point of an actuator that shifts the gear while holding the gear to the first stage and the R stage during ignition-on.

In more detail, as the result of performing the off-time range verifying step (S10), when the shift lever is positioned in the P range, a 1R verifying step (S20) of verifying whether the odd stage and the even stage of the DCT are coupled to the first stage and the R stage, respectively is performed, and as a result of performing the 1R verifying step (S20), when the odd stage and the even stage are coupled to the first stage and the R stage, respectively, the shift stage holding step (S30) is performed and when the odd stage and the even stage are not coupled to the first stage and the R stage, respectively, a 1R coupling step (S40) of coupling the odd stage and the even stage to the first stage and the R stage, respectively is performed.

That is, when the shift lever selects the P range during ignition-off, since the odd stage is in a state in which the first-stage gear is coupled and the even stage is in a state in which the R-stage gear is coupled, noise is reduced by minimizing the coupling and decoupling operations of the gear as possible through the shift stage holding step (S30) and if the first stage and the R stage are not coupled, the first stage and the R stage are coupled by performing the 1R coupling step (S40) and thereafter, noise is prevented from being generated by the coupling of the first stage and the R stage during ignition-on.

FIG. 3 is a diagram separately illustrating a control method during ignition-on according to the present invention. The control method includes an on-time range verifying step (S50) of verifying a range where the shift lever is positioned; and a 1R cranking waiting step (S60) of respectively coupling the first stage and the R stage after waiting until an engine is cranked when the odd stage and the even stage are not coupled to the first stage and the R stage, respectively in the case where the shift lever is positioned in the P range or the R range.

Further, as a result of performing the on-time range verifying step (S50), in the case where the shift lever is positioned in the P range or the R range, when the odd stage and the even stage are coupled to the first stage and the R stage, respectively, the state is held as it is.

That is, after ignition-off by the control method, when ignition-on of the vehicle is achieved, in the case where the shift lever is positioned in the P range, since the odd stage and the even stage are generally coupled to the first stage and the R stage, respectively, this state is held as it is, and noise is prevented from being generated and even though the shift lever is in the R range or in the P range, if the first stage and the R stage are not coupled, when the engine is cranked after waiting until the engine is substantially cranked, the odd stage and the even stage are coupled to the first stage and the R stage, respectively at that time, and as a result, noise is buried in cranking sound of the engine. Therefore it is difficult for the passenger of the vehicle to substantially feel noise.

The strategy may be applied even to a case other than the case where the shift lever is in the P or R range, and as a result, as the result of performing the on-time range verifying step (S50), in the case where the shift lever is in an N or D range or an M range which is a manual mode, when the odd stage is not coupled to the first stage, a 1-stage cranking waiting step (S70) of coupling the first stage after waiting until the engine is cranked is performed.

Accordingly, noise generated by coupling the gear to the first stage during ignition-on is buried in the cranking noise of the engine, and as a result, a noise characteristic of the DCT vehicle may be significantly improved.

For reference, in FIGS. 2 and 3, IG represents ignition and GA represents a gear actuator that shifts the gear.

The noise caused by the coupling and decoupling of the gear generated when ignition on and off of the DC mounted vehicle in the P range are switched to each other, and the merchantability of the vehicle can be increased by improving the noise performance of the vehicle by preventing the noise generated by the coupling of the gear as possible from being remarkable in other shift ranges.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A Dual Clutch Transmission (DCT) control method for a vehicle, comprising:

verifying a range where a shift lever is positioned during an ignition-off mode, to form an off-time range verifying step;

holding a current state, to form a shift stage holding step, when an odd stage and an even stage of a DCT are in a first stage and an Reverse (R) stage, respectively in the case where the shift lever is positioned in a Park (P) range as a result of performing the off-time range verifying step;

verifying a range where the shift lever is positioned during ignition-on, to form an on-time range verifying step; and respectively coupling the first stage and the R stage after waiting until an engine is cranked when the odd state and the even state are not coupled to the first stage and the R stage, respectively in the case where the shift lever is positioned in the P range or the R range, as a result of performing the on-time range verifying step, to form a 1R cranking waiting step.

2. The DCT control method for the vehicle of claim 1, further comprising:

as the result of performing the off-time range verifying step, when the shift lever is positioned in the P range, verifying whether the odd stage and the even stage of the DCT are coupled to the first stage and the R stage, respectively, to form a 1R verifying step, and as a result of performing the 1R verifying step, when the odd stage and the even stage are coupled to the first stage and the R stage, respectively, performing the shift stage holding step and when the odd stage and the even stage are not coupled to the first stage and the R stage, respectively, coupling the odd stage and the even stage to the first stage and the R stage, respectively, to form a 1R coupling step.

3. The DCT control method for the vehicle of claim 1, further comprising:

maintaining the state when, as the result of performing the on-time range verifying step, in the case where the shift lever is positioned in the P range or the R range, when the odd stage and the even stage are coupled to the first stage and the R stage, respectively.

4. The DCT control method for the vehicle of claim 1, further comprising:

verifying a range where the shift lever is positioned during ignition-on, to form an on-time range verifying step; and coupling the first stage after waiting until the engine is cranked, as the result of performing the on-time range verifying step, in the case where the shift lever is in an Neutral (N) or Drive (D) range or a manual (M) range, when the odd stage is not coupled to the first stage, to form a 1-stage cranking waiting step.

\* \* \* \* \*